(12) United States Patent
Noda (10) Patent No.: US 8,482,267 B2
(45) Date of Patent: Jul. 9, 2013

(54) VARIABLE VOLTAGE DC-DC CONVERTER

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 309 days.

(21) Appl. No.: 12/934,117

(22) PCT Filed: Apr. 6, 2009

(86) PCT No.: PCT/JP2009/057414
§ 371 (c)(1),
(2), (4) Date: Sep. 23, 2010

(87) PCT Pub. No.: WO2009/125860
PCT Pub. Date: Oct. 15, 2009

(65) Prior Publication Data
US 2011/0018513 A1    Jan. 27, 2011

(30) Foreign Application Priority Data
Apr. 11, 2008    (JP) .................................. 2008-104003

(51) Int. Cl.
*G05F 1/40* (2006.01)
(52) U.S. Cl.
USPC .......................................... 323/282; 323/284
(58) Field of Classification Search
USPC ................. 323/282–290, 311–315, 273, 274;
363/16–20, 34, 97, 45, 89
See application file for complete search history.

(56) References Cited

U.S. PATENT DOCUMENTS

| | | | |
|---|---|---|---|
| 5,594,324 A | | 1/1997 | Canter et al. |
| 6,304,066 B1 * | | 10/2001 | Wilcox et al. ................. 323/282 |
| 6,646,426 B2 * | | 11/2003 | Terashi .......................... 323/285 |
| 6,861,826 B2 * | | 3/2005 | Lynch ............................. 323/224 |
| 7,031,175 B2 * | | 4/2006 | Dequina et al. ............... 363/127 |
| 7,148,667 B2 * | | 12/2006 | Umemoto et al. ............ 323/282 |
| 7,518,894 B2 * | | 4/2009 | Fosler et al. .................... 363/72 |
| 7,683,594 B2 * | | 3/2010 | Kim et al. ...................... 323/282 |

(Continued)

FOREIGN PATENT DOCUMENTS

| | | | |
|---|---|---|---|
| JP | 3-60526 | * | 3/1991 |
| JP | 4-189003 | * | 7/1992 |

(Continued)

OTHER PUBLICATIONS

International Search Report and Written Opinion in PCT/JP2009/057414.

(Continued)

*Primary Examiner* — Rajnikant Patel
(74) *Attorney, Agent, or Firm* — Cooper & Dunham LLP (57) ABSTRACT

A DC-DC converter configured to vary an output voltage includes an oscillator circuit configured to output a first clock signal; a digital-to-analog converter controlled based on the first clock signal input thereto and configured to output a voltage according to a voltage setting signal; a delay circuit configured to output a second clock signal delayed by a predetermined delay time with respect to the first clock signal input thereto; an error amplifier circuit having the output voltage of the digital-to-analog converter input thereto as a reference voltage; a pulse width modulation comparator provided with an output of the error amplifier circuit and a voltage into which a current flowing through an inductor is converted; and a control part configured to control a switching transistor of the DC-DC converter based on the second clock signal output by the delay circuit and an output of the pulse width modulation comparator.

4 Claims, 5 Drawing Sheets

U.S. PATENT DOCUMENTS

| | | | |
|---|---|---|---|
| 7,880,454 B2 * | 2/2011 | Latham et al. | 323/284 |
| 2002/0135345 A1 | 9/2002 | Terashi | |
| 2004/0207375 A1 | 10/2004 | Umemoto et al. | |
| 2007/0057650 A1 | 3/2007 | Umemoto et al. | |
| 2009/0066305 A1 | 3/2009 | Noda | |

FOREIGN PATENT DOCUMENTS

| | | |
|---|---|---|
| JP | 2002281742 | 9/2002 |
| JP | 2004320892 | 11/2004 |
| JP | 2006158038 | 6/2006 |
| JP | 2007116804 | 5/2007 |
| JP | 200971920 | 4/2009 |
| JP | 2009130972 | 6/2009 |
| JP | 2009219179 | 9/2009 |
| JP | 2009258809 | 11/2009 |
| JP | 2009261048 | 11/2009 |
| JP | 201051079 | 3/2010 |
| JP | 201051152 | 3/2010 |
| JP | 201063333 | 3/2010 |
| JP | 201068553 | 3/2010 |

OTHER PUBLICATIONS

Mar. 20, 2012 Korean official action (with English translation) in connection with counterpart Korean patent application No. 10-2010-7021509.

* cited by examiner

FIG.5

VARIABLE VOLTAGE DC-DC CONVERTER

TECHNICAL FIELD

A certain aspect of one or more embodiments discussed herein is related to DC-DC converters capable of varying voltage, such as a DC-DC converter using the output voltage of a digital-to-analog (d/a) converter for a reference voltage.

BACKGROUND ART

In these years, it has been desired to save energy in terms of environmental measures as well. In apparatuses using batteries, such as cellular phones and digital cameras, it has become increasingly important to reduce power consumed inside the apparatus in terms of a longer battery service life as well. Therefore, non-isolated DC-DC converters using an inductor, which are highly efficient and also reducible in size, are often used as power supply circuits.

Further, apparatuses have become more sophisticated, so that, for example, video has been recorded and reproduced more frequently than still images. As a result, CPUs used in apparatuses have become higher in performance to operate at higher clock frequencies. However, higher clock frequencies cause the problem of an increase in current consumption proportional to the increase in clock frequency. Further, higher clock frequencies require higher supply voltage. This results in a substantial increase in power consumption. Therefore, supply voltage is reduced for lower clock frequencies at the time of regular operations, and supply voltage is increased for higher clock frequencies only when high-speed processing is necessary as in the case of processing video, thereby minimizing an increase in power consumption.

In order to meet such requirements, DC-DC converters capable of changing output voltage in accordance with a voltage setting signal are needed.

As a method for changing output voltage, the method illustrated in Japanese Laid-Open Patent Application No. 2007-116804 is known, where the output voltage of a d/a converter is used as a reference voltage used for a DC-DC converter and a voltage setting signal fed from a control circuit such as a CPU is input to the d/a converter, thereby changing the output voltage of the d/a converter.

However, if the same clock signal is used for causing the d/a converter to operate and for switching the DC-DC converter, this results in the problem of reduction in response speed in changing the output voltage of the DC-DC converter.

Figure 1:
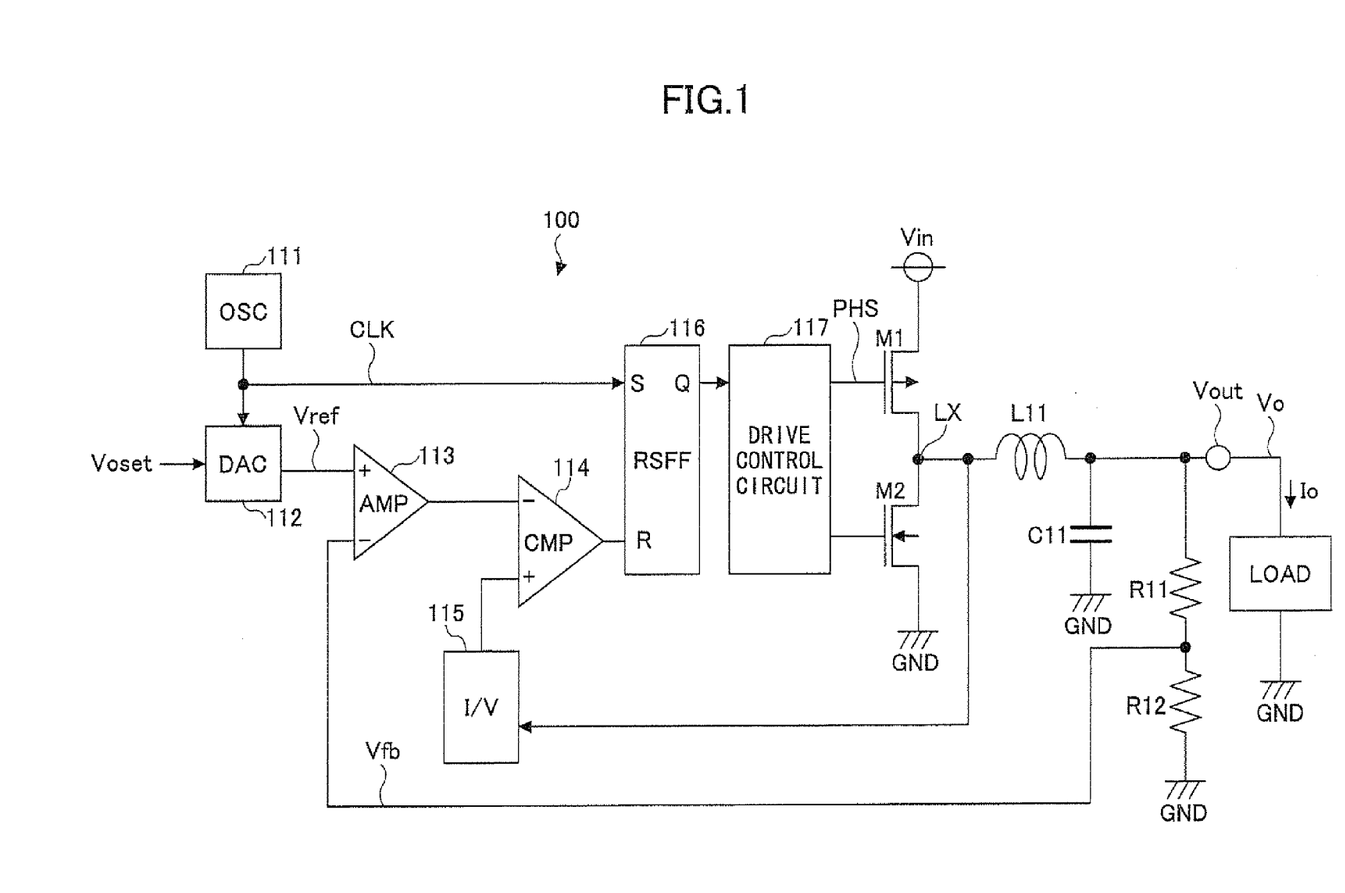
FIG. 1 is a circuit diagram illustrating a conventional DC-DC converter using the output voltage of a d/a converter as a reference voltage.

A description is given in more detail of this problem. FIG. 1 is a circuit diagram of a conventional DC-DC converter using the output voltage of a d/a converter as a reference voltage.

Referring to FIG. 1, a DC-DC converter 100 is, which is a current-mode controlled DC-DC converter, includes an oscillator circuit (OSC) 111, a d/a converter (DAC) 112, an error amplifier circuit (AMP) 113, a pulse-width modulation (PWM) comparator (CMP) 114, an inductor current detector circuit (I/V) 115, an R-S flip-flop circuit (RSFF) 116, a drive control circuit 117, a switching transistor M1, a synchronous rectification transistor M2, an inductor L11, a capacitor C11, a resistor R11, and a resistor R12.

The oscillator circuit 111 outputs a clock signal CLK, which is input to the d/a converter 112 and the SET input S of the R-S flip-flop circuit 116.

Figure 2:
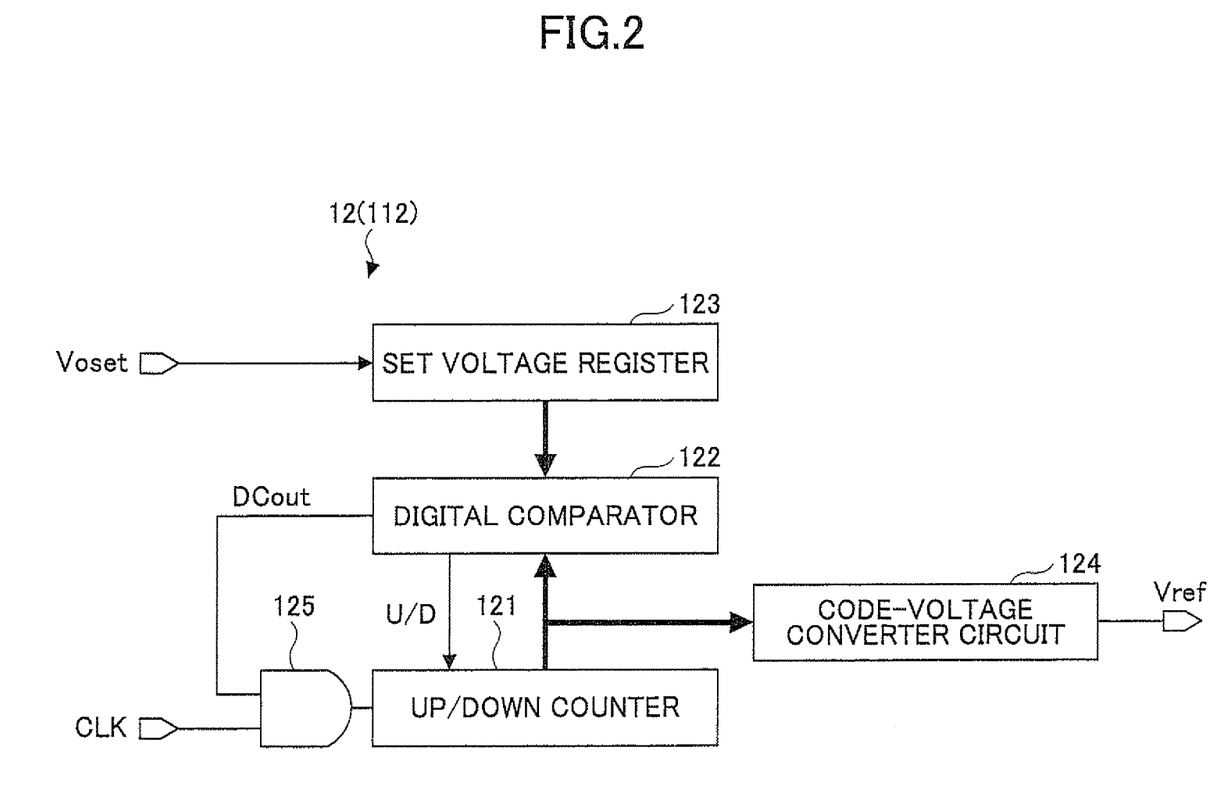
FIG. 2 is a block diagram for illustrating an operation of the d/a converter.

FIG. 2 is a diagram illustrating the d/a converter 112. A description is given, with reference to FIG. 2, of the d/a converter 112.

Referring to FIG. 2, the d/a converter 112 includes an up/down counter 121, a digital comparator 122, a set voltage register 123, a code-voltage converter circuit 124, and an AND circuit 125.

The up/down counter 121 counts pulses of the clock signal CLK input through the AND circuit 125, and outputs the result of the counting to the digital comparator 122 and the code-voltage converter circuit 124 as an output code signal. Further, the up/down counter 121 counts up or counts down depending on an up/down signal U/D.

The set voltage register 123 stores a voltage setting signal Voset output by a control circuit (not graphically illustrated), and outputs the value of the voltage setting signal Voset to the digital comparator 122 as an output code signal.

The digital comparator 122 compares the output code of the set voltage register 123 and the output code of the up/down counter 121. The level of the signal output from the output terminal DCout of the digital comparator 122 is LOW if the output codes are equal or HIGH if the output codes are different. Further, the up/down signal U/D is switched to DOWN if the output code of the up/down counter 121 is greater than the output code of the set voltage register 123, and to UP if the output code of the up/down counter 121 is smaller than the output code of the set voltage register 123.

The code-voltage converter circuit 124 converts the output code of the up/down counter 121 into voltage, and outputs the voltage. This output is the output of the d/a converter 112 and is used as the reference voltage Vref of the DC-DC converter 100.

The output of the d/a converter 112 is connected to the non-inverting input of the error amplifier circuit 113. A voltage Vfb generated by dividing the output voltage Vo of the DC-DC converter 100 between the resistor R11 and the resistor R12 is input to the inverting input of the error amplifier circuit 113. The output of the error amplifier circuit 113 is connected to the inverting input of the PWM comparator 114. The output of the inductor current detector circuit 115 is connected to the non-inverting input of the PWM comparator 114.

The inductor current detector circuit 115 converts a current that flows through the inductor L11 into voltage, and outputs a ramp voltage subjected to slope compensation for preventing subharmonic oscillation.

The output level of the PWM comparator 114 becomes HIGH to reset the R-S flip-flop circuit 116 when the output of the inductor current detector circuit 115 reaches the output voltage of the error amplifier circuit 113.

The R-S flip-flop circuit 116 is set to turn its Q output HIGH when the level of the clock signal CLK input to its SET input S becomes HIGH. The Q output is connected to the drive control circuit 117.

When the input level of the drive control circuit 117 becomes HIGH, the drive control circuit 117 turns a control signal PHS LOW. On the other hand, when the input level of the drive control circuit 117 becomes LOW, the drive control circuit 117 turns the control signal PHS HIGH.

The control signal PHS is input to the gate of the switching transistor M1, which is a p-channel MOS transistor (hereinafter, PMOSFET), so that the switching transistor M1 turns ON or OFF in accordance with the control signal PHS.

The synchronous rectification transistor M2, which is an n-channel MOS transistor (hereinafter, NMOSFET), is controlled so as to turn ON or OFF complementarily to the switching transistor M1.

It is assumed that the voltage setting signal Voset is output by a control circuit (not graphically illustrated) so that a new target value for the reference voltage Vref is written to the set voltage register 123. In this case, the level at the output terminal DCout of the digital comparator 122 becomes HIGH so as to open the gate of the AND circuit 125. As a result, the clock signal CLK is applied to the clock input of the up/down counter 121. If the new target voltage is higher than the previous one, the digital comparator 122 outputs an UP signal. As a result, the up/down counter 121 counts up.

The code-voltage converter circuit 124 outputs a voltage according to the output code of the up/down counter 121 as the output voltage (reference voltage Vref) of the d/a converter 112. Therefore, every time a pulse of the clock signal CLK is input to the up/down counter 121, the output voltage (Vref) of the d/a converter 112 is changed for one bit.

Figure 3:
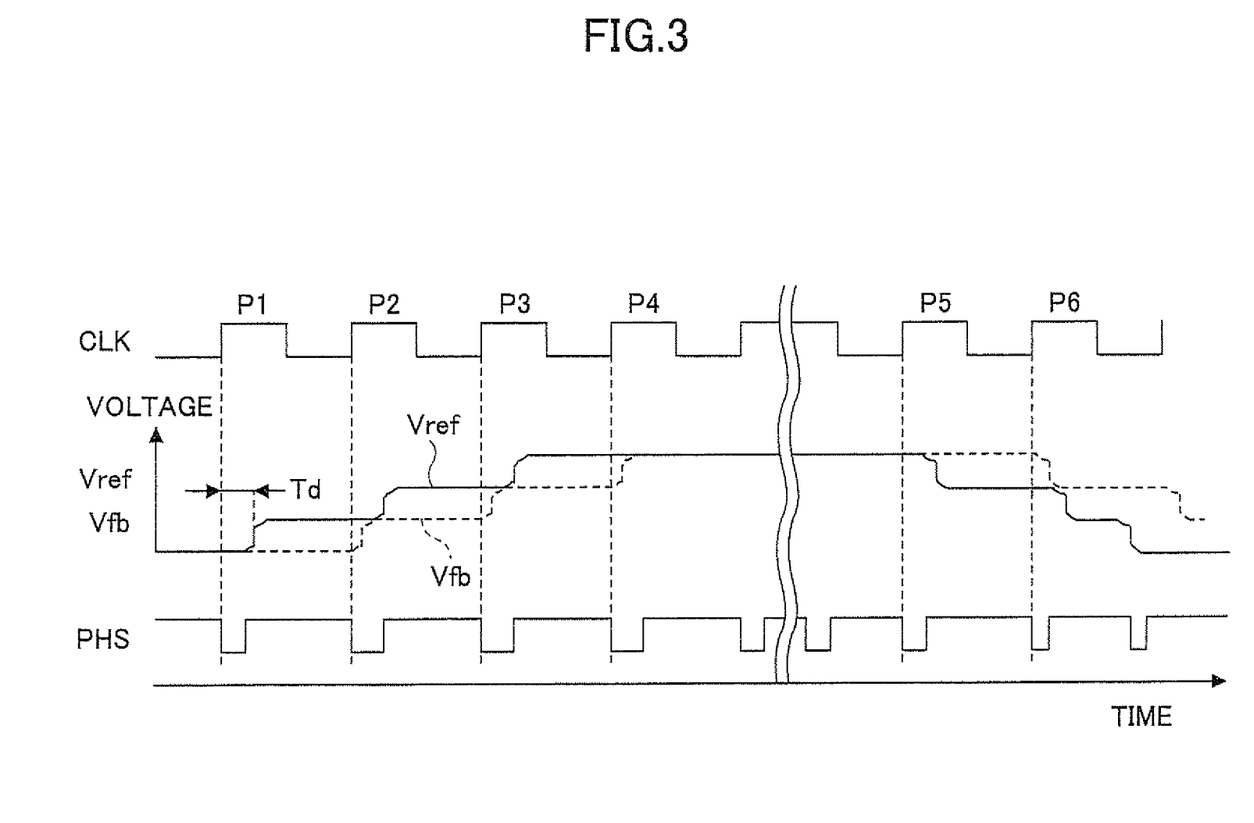
FIG. 3 is a timing chart of signals for illustrating an operation of the conventional DC-DC converter.

FIG. 3 is a timing chart of signals illustrating the clock signal CLK and the operations of the d/a converter 112 and the DC-DC converter 100. For explanatory purposes, pulses of the clock signal CLK are numbered P1 through P6.

In the case of increasing the reference voltage Vref, the voltage setting signal Voset causes the code of a voltage higher than the current value of the reference voltage Vref to be written to the set voltage register 123. Then, the level at the output terminal DCout of the digital comparator 122 becomes HIGH so as to open the gate of the AND circuit 125. As a result, the clock signal CLK is input to the up/down counter 121. Further, since the digital comparator 122 outputs an UP signal, the up/down counter 121 counts up.

When the clock signal CLK becomes HIGH (in level) at P1, the count of the up/down counter 121 is incremented by one, so that the reference voltage Vref is increased for one bit. However, the processing time of the up/down counter 121 and/or the code-voltage converter circuit 124 causes a time delay Td before the reference voltage Vref increases for one bit.

On the other hand, when the clock signal CLK becomes HIGH at P1, the control signal PHS immediately becomes LOW (in level), so that the DC-DC converter 100 starts the switching of the switching transistor M1 by turning the switching transistor M1 ON. However, the reference voltage Vref at this time is still at a level before the clock signal CLK becomes HIGH at P1. Therefore, the reference voltage Vref is equal to the divided voltage Vfb of the output voltage Vo, and no change in the reference voltage Vref is reflected in the ON time of the switching transistor M1. Therefore, the output voltage Vo (voltage Vfb) does not change at P1 of the clock signal CLK.

The output voltage Vo starts changing at the inputting of P2 of the clock signal CLK. In this case also, however, the ON time of the switching transistor M1 is determined based on the reference voltage Vref that has changed at P1 of the clock signal CLK. Thus, the change of the output voltage Vo is always delayed by one clock cycle.

Also in the case of reducing the reference voltage Vref, there is a problem in that the change of the output voltage Vo is always delayed by one clock cycle as indicated by P5 and P6 of the clock signal CLK in FIG. 3.

SUMMARY OF INVENTION

According to one aspect of the present invention, there is provided a DC-DC converter whose output voltage can quickly follow a change in a reference voltage.

According to one embodiment of the present invention, a DC-DC converter configured to vary an output voltage is provided that includes an oscillator circuit configured to output a first clock signal; a digital-to-analog converter controlled based on the first clock signal input thereto and configured to output a voltage according to a voltage setting signal; a delay circuit configured to output a second clock signal delayed by a predetermined delay time with respect to the first clock signal input thereto; an error amplifier circuit having the output voltage of the digital-to-analog converter input thereto as a reference voltage; a pulse width modulation comparator provided with an output of the error amplifier circuit and a voltage into which a current flowing through an inductor is converted; and a control part configured to control a switching transistor of the DC-DC converter based on the second clock signal output by the delay circuit and an output of the pulse width modulation comparator.

BRIEF DESCRIPTION OF DRAWINGS

Other objects, features and advantages of the present invention will become more apparent from the following detailed description when read in conjunction with the accompanying drawings, in which.

DESCRIPTION OF EMBODIMENTS

A description is given below, with reference to the accompanying drawings, of an embodiment of the present invention.

Figure 4:
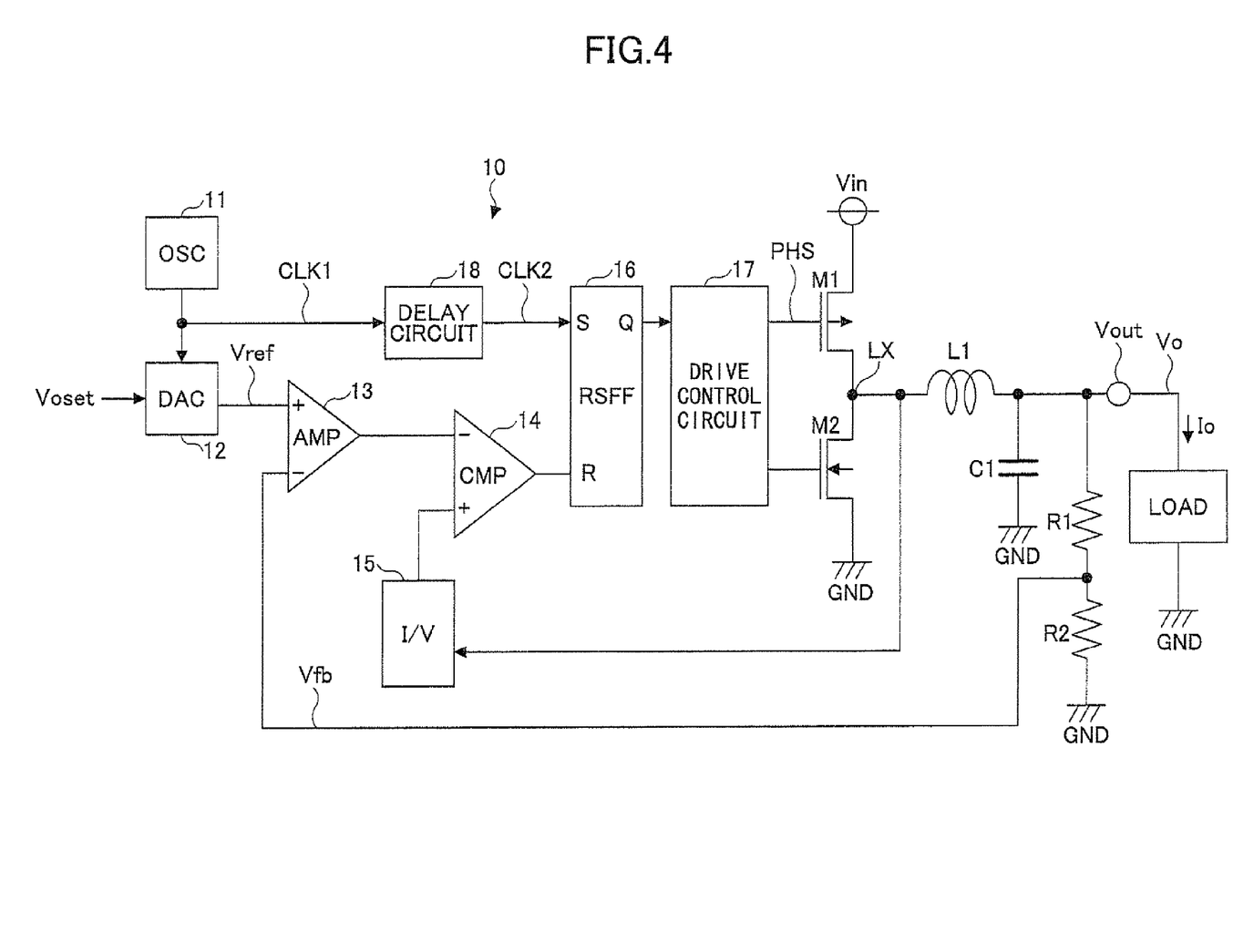
FIG. 4 is a circuit diagram illustrating a DC-DC converter according to an embodiment of the present invention.

FIG. 4 is a circuit diagram illustrating a DC-DC converter according to the embodiment of the present invention.

Referring to FIG. 4, a DC-DC converter 10 of this embodiment, which is a current-mode controlled DC-DC converter, includes an oscillator circuit (OSC) 11, a d/a converter (DAC) 12, an error amplifier circuit (AMP) 13, a delay circuit 18, a pulse-width modulation (PWM) comparator (CMP) 14, an inductor current detector circuit (I/V) 15, an R-S flip-flop circuit (RSFF) 16, a drive control circuit 17, a switching transistor M1 formed of a PMOSFET, a synchronous rectification transistor M2 formed of an NMOSFET, an inductor L1, a capacitor C1, a resistor R1, and a resistor R2.

The delay circuit 18 is connected between the oscillator circuit 11 and the SET input S of the R-S flip-flop circuit 16.

The oscillator circuit 11 outputs a first clock signal CLK1, which is input to the d/a converter 12 and the delay circuit 18. The first clock signal CLK1 corresponds to the clock signal CLK illustrated in FIGS. 1 through 3.

The delay circuit 18 delays the input first clock signal CLK1 for a predetermined time, and outputs the delayed first clock signal CLK1 as a second clock signal CLK2 to the SET input S of the R-S flip-flop circuit 16.

The predetermined delay time is substantially equal to the settling time of the d/a converter 12 before the output voltage (Vref) of the d/a converter 12 changes for one bit since a pulse of the first clock signal CLK1 is input to the d/a converter 12. Thus, this predetermined delay time is also denoted by Td.

The delay circuit 18 may be any delay circuit such as one using a resistor and a capacitor or one using a shift register or a counter. The delay circuit 18 may be a conventionally-used delay circuit.

The output of the d/a converter 12 is connected to the non-inverting input of the error amplifier circuit 13. The output of the d/a converter 12 is used as the reference voltage Vref of the DC-DC converter 10. The d/a converter 12 has the same configuration as the d/a converter 112 illustrated in FIG. 2, and accordingly, a description of the configuration of the d/a converter 12 is omitted to avoid redundancy.

A voltage Vfb generated by dividing the output voltage Vo of the DC-DC converter 10 between the resistor R1 and the resistor R2 is input to the inverting input of the error amplifier circuit 13. The output of the error amplifier circuit 13 is connected to the inverting input of the PWM comparator 14. The output of the inductor current detector circuit 15 is connected to the non-inverting input of the PWM comparator 14.

The inductor current detector circuit 15 converts a current that flows through the inductor L1 into voltage, and outputs a ramp voltage subjected to slope compensation for preventing subharmonic oscillation.

The output level of the PWM comparator 14 becomes HIGH to reset the R-S flip-flop circuit 16 when the output of the inductor current detector circuit 15 reaches the output voltage of the error amplifier circuit 13.

The R-S flip-flop circuit 16 is set to turn its Q output HIGH when the level of the second clock signal CLK2 input to its SET input S becomes HIGH. The Q output is connected to the drive control circuit 17.

When the input level of the drive control circuit 17 becomes HIGH, the drive control circuit 17 turns a control signal PHS LOW. On the other hand, when the input level of the drive control circuit 17 becomes LOW, the drive control circuit 17 turns the control signal PHS HIGH.

The control signal PHS is input to the gate of the switching transistor M1, which is a PMOSFET, so that the switching transistor M1 turns ON or OFF in accordance with the control signal PHS.

The synchronous rectification transistor M2, which is an NMOSFET, is controlled so as to turn ON or OFF complementarily to the switching transistor M1.

Figure 5:
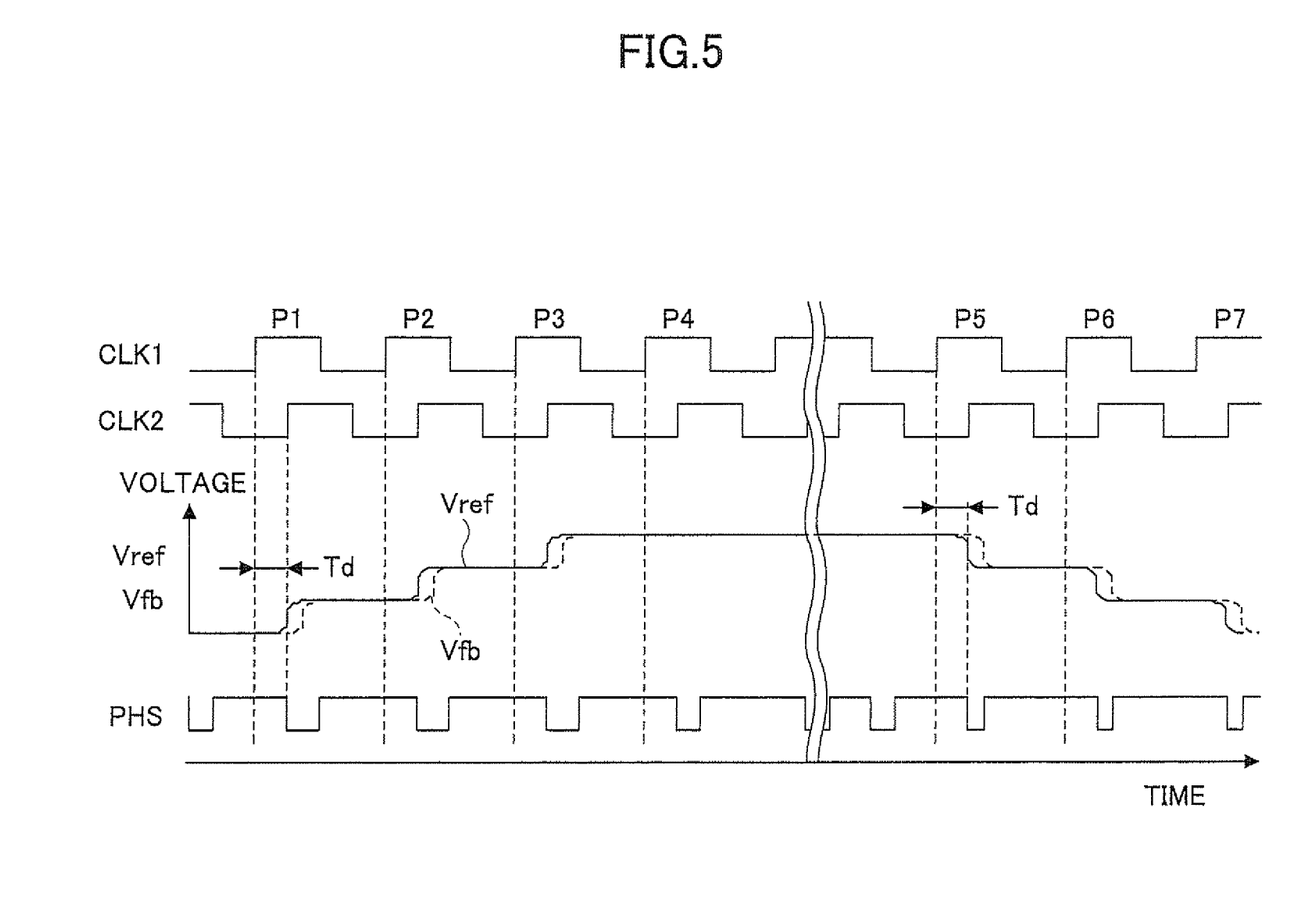
FIG. 5 is a timing chart of signals for illustrating an operation of the DC-DC converter according to the embodiment of the present invention.

FIG. 5 is a timing chart of signals for illustrating an operation of the circuit of FIG. 4. Compared with the timing chart of FIG. 3, the timing chart of FIG. 5 additionally includes the second clock signal CLK2 output by the delay circuit 18. The second clock signal CLK2 is generated by delaying the first clock signal CLK1 for the predetermined delay time Td.

In the case of increasing the reference voltage Vref, when the first clock signal CLK1 becomes HIGH (in level) at P1, the count of the up/down counter 121 is incremented by one, so that the reference voltage Vref is increased for one bit. However, it is when the delay time Td has passed since the first clock signal CLK1 becoming HIGH at P1 that the reference voltage Vref completes one bit's worth of increase.

Since the second clock signal CLK2 rises (becomes HIGH) after passage of the delay time Td, the reference voltage Vref has already increased for one bit when the DC-DC converter 10 performs switching control. The ON time of the switching transistor M1 is controlled based on this increased reference voltage Vref. Accordingly, like the divided voltage Vfb indicated by a broken line in FIG. 5, the output voltage Vo (divided voltage Vfb) increases according to the reference voltage Vref.

As described above, according to this embodiment, the response delay of the output voltage Vo is caused by only the time delay Td of the d/a converter 12 and a delay due to switching control, so that it is possible to substantially improve response speed compared with the conventional system.

Further, the time delay (interval) between the first clock signal CLK1 and the second clock signal CLK2 is substantially equal to the time delay Td of the d/a converter. Therefore, it is possible to minimize the response delay of the output voltage Vo.

The same holds in the case of reducing the reference voltage Vref. When the first clock signal CLK1 becomes HIGH (in level) at P5, the reference voltage is reduced for one bit after passage of the delay time Td. The second clock signal CLK2 becomes HIGH (in level) after passage of the same delay time Td since the first clock signal CLK1 becoming HIGH at P5. Therefore, when the switching transistor M1 turns ON, the reference voltage Vref has already been reduced for one bit, so that it is possible to control the ON time of the switching transistor M1 based on this reduced reference voltage Vref. Accordingly, the same as in the case of increasing the output voltage Vo, the response delay of the output voltage Vo (divided voltage Vfb) is caused by only the time delay Td of the d/a converter 12 plus a delay due to switching control, so that it is possible to substantially improve response speed compared with the conventional system.

Thus, according to one aspect of the present invention, a clock signal for controlling a switching transistor is delayed, with respect to a clock signal for changing a reference voltage, for a settling time taken to change the reference voltage for one bit. Accordingly, it is possible to substantially improve response delay in changing the output voltage of a DC-DC converter.

The present invention is not limited to the specifically disclosed embodiment, which is exemplary in every respect and non-limiting, and variations and modifications may be made without departing from the scope of the present invention.

The present application is based on Japanese Priority Patent Application No. 2008-104003, filed on Apr. 11, 2008, the entire contents of which are incorporated herein by reference.

The invention claimed is:

1. A DC-DC converter configured to vary an output voltage, comprising:
    an oscillator circuit configured to output a first clock signal;
    a digital-to-analog converter controlled based on the first clock signal input thereto and configured to output a voltage according to a voltage setting signal;
    a delay circuit configured to output a second clock signal delayed by a predetermined delay time with respect to the first clock signal input thereto, a pulse width of the first clock signal being the same as a pulse width of the second clock signal;
    an error amplifier circuit having the output voltage of the digital-to-analog converter input thereto as a reference voltage;
    a pulse width modulation comparator provided with an output of the error amplifier circuit and a voltage into which a current flowing through an inductor is converted; and
    a control part configured to control a switching transistor of the DC-DC converter based on the second clock signal output by the delay circuit and an output of the pulse width modulation comparator.

2. The DC-DC converter as claimed in claim 1, wherein the predetermined delay time is substantially equal to a settling time of the changing output voltage of the digital-to-analog converter at a time when the digital-to-analog converter operates for one clock cycle.

3. The DC-DC converter as claimed in claim 1, wherein the digital-to-analog converter includes an up/down counter, and is configured to output the voltage according to an output code of the up/down counter.

4. The DC-DC converter as claimed in claim 1, wherein the predetermined delay time is substantially equal to a settling time of the digital-to-analog converter before the reference voltage changes for one hit since a pulse of the first clock signal is input to the digital-to-analog converter.

* * * * *